United States Patent
Hattermann et al.

(10) Patent No.: US 12,467,848 B2
(45) Date of Patent: Nov. 11, 2025

(54) SENSOR ARRANGEMENT FOR DETECTING PARTICLE FEATURES

(71) Applicant: Q.ant GmbH, Stuttgart (DE)

(72) Inventors: Helge Hattermann, Pliezhausen (DE); Stefan Hengesbach, Stuttgart (DE); Michael Foertsch, Ansbach (DE)

(73) Assignee: Q.ANT GMBH, Stuttgart (DE)

( * ) Notice: Subject to any disclaimer, the term of this patent is extended or adjusted under 35 U.S.C. 154(b) by 141 days.

(21) Appl. No.: 18/508,266

(22) Filed: Nov. 14, 2023

(65) Prior Publication Data
US 2024/0085307 A1  Mar. 14, 2024

Related U.S. Application Data

(63) Continuation of application No. PCT/EP2022/060472, filed on Apr. 21, 2022.

(30) Foreign Application Priority Data

May 18, 2021 (DE) .................. 10 2021 205 022.0

(51) Int. Cl.
*G01N 15/14*  (2024.01)
*G01N 15/1434*  (2024.01)

(52) U.S. Cl.
CPC . *G01N 15/1434* (2013.01); *G01N 2015/1493* (2013.01); *G01N 2015/1497* (2013.01)

(58) Field of Classification Search
CPC .......... G01N 15/1434; G01N 15/1429; G01N 15/1459; G01N 15/0205;
(Continued)

(56) References Cited

U.S. PATENT DOCUMENTS

9,632,030 B1 * 4/2017 Houston ............ G01N 15/1427
10,458,990 B1 * 10/2019 Manautou .......... G01N 21/6486
(Continued)

FOREIGN PATENT DOCUMENTS

CN  111859800 A  10/2020
DE  102015122306 A1  6/2017
(Continued)

OTHER PUBLICATIONS

Giannopoulos, Antonios, et al.,"Data-driven order reduction and velocity field reconstruction using neural networks: The case of a turbulent boundary layer," Physics of Fluids, Sep. 2020, pp. 1-12, vol. 32, Issue 9, AIP Publishing, Melville, NY, USA.

*Primary Examiner* — Sang H Nguyen
(74) *Attorney, Agent, or Firm* — LEYDIG, VOIT & MAYER, LTD.

(57) ABSTRACT

A sensor arrangement for detecting features of particles includes an emitter for emitting electromagnetic radiation, a detector for receiving the electromagnetic radiation emitted from the emitter and for providing detector signals based on the received electromagnetic radiation, and a measurement volume irradiable by the electromagnetic radiation emitted by the emitter. The measurement volume is configured for receiving particles flowing therethrough. The sensor arrangement further includes a digitizing unit for digitizing the detector signals, and an evaluation unit for evaluating the detector signals. The evaluation unit stores a trained algorithm for machine learning. The algorithm is configured for determining at least one feature of the particles based on the detector signals.

11 Claims, 6 Drawing Sheets

(58) Field of Classification Search
CPC ... G01N 2015/1493; G01N 2015/1497; G01N 2015/0092; G01N 2015/0294
See application file for complete search history.

(56) References Cited

U.S. PATENT DOCUMENTS

| | | |
|---|---|---|
| 11,371,928 B2 | 6/2022 | Foertsch et al. |
| 2003/0110840 A1* | 6/2003 | Arriaga ............... G01N 15/1404 73/865.5 |
| 2004/0011975 A1* | 1/2004 | Nicoli ................ G01N 15/0227 250/574 |
| 2005/0151964 A1* | 7/2005 | Roth ....................... G01N 15/14 356/318 |
| 2005/0152593 A1* | 7/2005 | Calvin ............... G01N 15/1459 382/133 |
| 2009/0244536 A1* | 10/2009 | Mitchell ............ G01N 15/1433 250/573 |
| 2010/0027007 A1* | 2/2010 | Adams ................. G01N 15/147 356/338 |
| 2011/0276526 A1* | 11/2011 | Turbin ...................... G01T 1/28 250/311 |
| 2015/0233811 A1* | 8/2015 | Strohm .................. G01N 15/10 73/601 |
| 2017/0248513 A1 | 8/2017 | Liu et al. |
| 2018/0195945 A1 | 7/2018 | Schneider et al. |
| 2019/0183358 A1* | 6/2019 | Wakita ................... A61B 5/026 |

FOREIGN PATENT DOCUMENTS

| | | |
|---|---|---|
| DE | 102019209213 A1 | 12/2020 |
| WO | WO 2011097591 A2 | 8/2011 |

* cited by examiner

SENSOR ARRANGEMENT FOR DETECTING PARTICLE FEATURES

CROSS REFERENCE TO RELATED APPLICATIONS

This application is a continuation of International Application No. PCT/EP2022/060472 (WO 2022/242979 A1), filed on Apr. 21, 2022, and claims benefit to German Patent Application No. DE 10 2021 205 022.0, filed on May 18, 2021. The aforementioned applications are hereby incorporated by reference herein.

FIELD

Embodiments of the present invention relates to a sensor arrangement for detecting features of particles, and to a method for determining features of particles using a sensor arrangement.

BACKGROUND

DE 10 2019 209 213 A1 discloses a sensor arrangement for determining particle positions and particle sizes, in which the intensity and polarization of a laser beam is spatially varied by a mode conversion device.

However, the effort needed to determine the shape of the particles is comparatively high in the case of the apparatuses known from the prior art.

SUMMARY

Embodiments of the present invention provide a sensor arrangement for detecting features of particles. The sensor arrangement includes an emitter for emitting electromagnetic radiation, a detector for receiving the electromagnetic radiation emitted from the emitter and for providing detector signals based on the received electromagnetic radiation, and a measurement volume irradiable by the electromagnetic radiation emitted by the emitter. The measurement volume is configured for receiving particles flowing therethrough. The sensor arrangement further includes a digitizing unit for digitizing the detector signals, and an evaluation unit for evaluating the detector signals. The evaluation unit stores a trained algorithm for machine learning. The algorithm is configured for determining at least one feature of the particles based on the detector signals.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
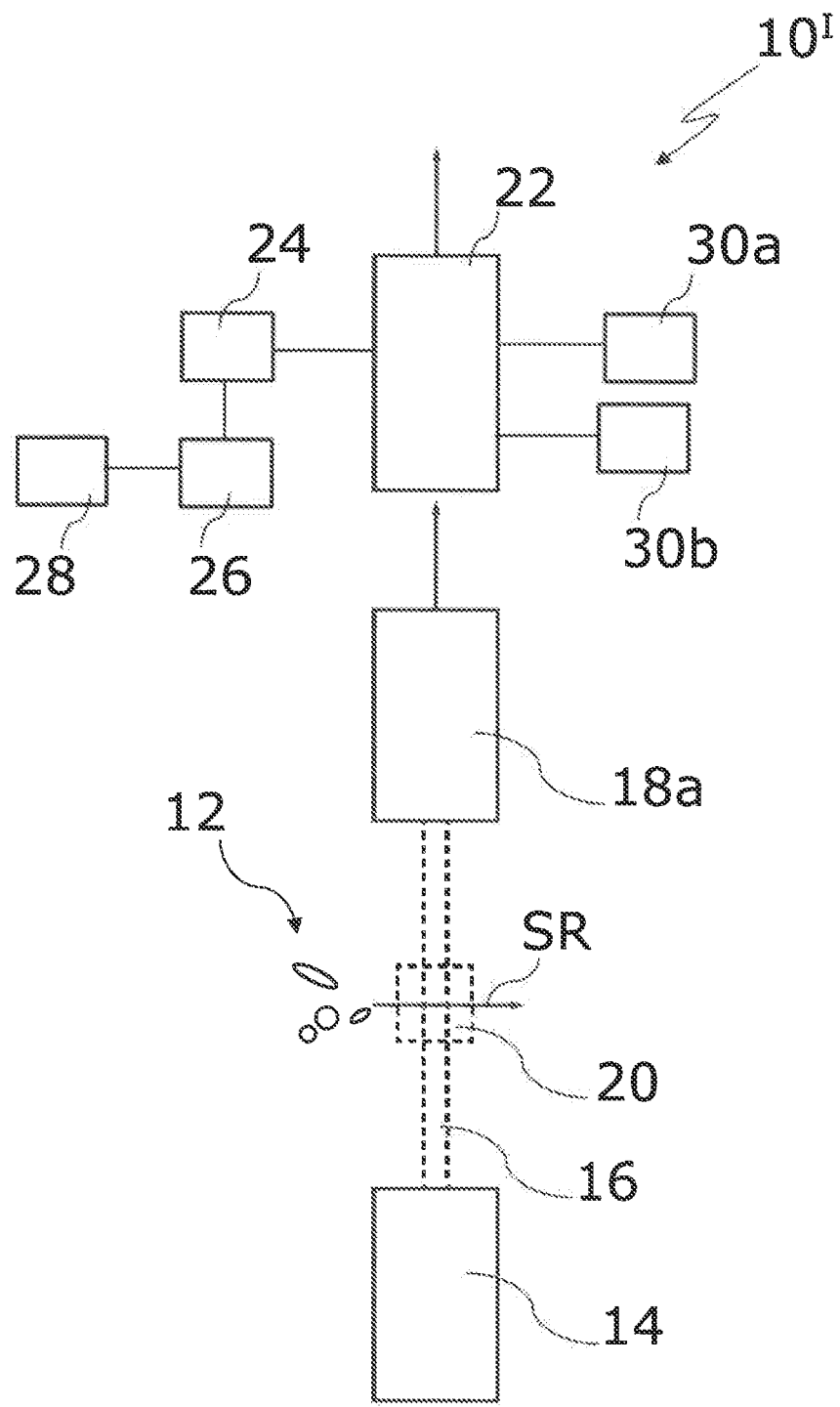
FIG. 1 schematically shows a first embodiment of a sensor arrangement for detecting particle features.

Embodiments of the present invention provide an apparatus with which features of particles, in particular their shapes, can be determined more quickly. Embodiments of the present invention also provide a method for determining the features of particles using such an apparatus.

According to some embodiments, a sensor arrangement for detecting features of particles includes:
a) an emitter for emitting electromagnetic radiation;
b) a detector for receiving radiation emitted from the emitter and for providing detector signals in dependence on the received radiation;
c) a measurement volume, which can be irradiated by the emitter by way of the radiation, for receiving particles flowing through;
d) a digitizing unit for digitizing the detector signals; and
e) an evaluation unit for evaluating the detector signals.
The sensor arrangement further includes:
f) a trained algorithm for machine learning stored in the evaluation unit, which is designed for determining at least one feature of the particles by way of the detector signals.

The algorithm for machine learning can be designed to determine a plurality of features of the particles. The particles flow through the measurement volume, which is penetrated by the radiation, usually with a known intensity. The measurement volume is arranged in particular along the path taken by the radiation emitted by the emitter. The radiation is preferably a laser beam. The particles scatter, reflect and/or absorb the radiation. The transmitted, scattered and/or reflected radiation is measured by the detectors, preferably photodetectors, in particular photodiodes. In conjunction therewith, the detector usually converts the radiation into electrical signals. Each particle therefore causes a signal peak on the detectors during the time it travels through the measurement volume. A suitable intensity distribution of the radiation causes in particular a signal peak which is proportional to the irradiated cross-sectional area of the respective particle and in particular depends on the shape of the relevant particle.

The evaluation unit preferably comprises a computer on which the algorithm for machine learning is stored. The evaluation unit in particular also comprises external computer resources, including in the form of servers or data memories, preferably for carrying out cloud computing. The algorithm for machine learning is designed in particular as a neural network. The algorithm for machine learning is preferably trained using detector signals relating to the features of known particles that flow through the measurement volume. Preferably, the algorithm for machine learning is trained to classify detected configurations of particles, for example, as agglomerations of particles, and/or to determine, from different detector signals by means of a regression, features of particles, for example, the sphericity of a particular particle as a characteristic indicator for how well the shape of the particle can be represented by a sphere. The algorithm for machine learning allows the selected features of each particle, such as its size and/or shape, to be determined by the sensor arrangement.

The sensor arrangement according to embodiments of the invention advantageously does not require a camera in combination with image recognition software to determine the shape of the particles. The recognition of the features of the particles, in particular the shape of the particles, can be significantly accelerated by the sensor arrangement compared with the known apparatuses from the prior art. The features of 106 particles per second can be determined. In particular, the shape of the particles in running processes can be determined in quasi-real time. This enables the in-line control of chemical processes, in particular of processes in which particles in a specific shape and/or with the lowest possible number of agglomerates are to be produced. The sensor arrangement can be used, among other things, to detect agglomerates in chemical processes, shape deviations in the production of particles, contamination in processes, foreign particles in granular foods (coffee beans, grain, flour, etc.), and/or air bubbles in particle suspensions.

Within the context of the application, particles are understood in particular to mean particles such as suspended particles. Training is understood in particular to mean a learning method or process. The term "feature" refers in particular to a property of the specific particle, such as the specific size of the particle, the specific shape of the particle, etc. The term "particles with known features" refers in particular to particles whose features to be examined are determined before they are calculated by the algorithm for machine learning.

Advantageously, the sensor arrangement is wherein a further emitter and/or further detector. The radiation can be directed at the particles from a plurality of directions using a plurality of emitters. A plurality of detectors can be used to measure the radiation scattered by the particles in a plurality of directions or under different polarizations. By combining the signals obtained from the different incidence or scattering directions, the precision of the measurement results can be significantly increased.

Preferably, the sensor arrangement is characterized in that the detector signals comprise the intensity, the polarization and/or the scattering angles of the radiation received by the detector. The radiation is scattered and/or absorbed by the particles, with the result that the shape or position of the particles can be determined from the distribution of the intensity and in particular the associated scattering angles. The particles also change the polarization of the radiation that is incident on the particles, with the result that the polarization of the radiation can also be used to determine the shapes and positions of the particles. By combining these measurement values, the precision of the results for the selected particle features can be advantageously increased.

In an advantageous refinement, the features of the particles comprise the size of the respective particles, a parameter for the shape of the respective particles, a predetermined particle class, the distance between two respective particles, an overlap of particles, the flight direction of the respective particles, the velocity of the respective particles, and/or a spatial orientation of the respective particles.

The size of the particles is preferably between 100 nm and 10 mm, in particular between 1 µm and 100 µm. The size of the particles to be measured depends in particular on the size of the radiation field in the measurement volume. With a beam diameter of 20 µm, the diameter of the particles is typically in the range of 1 µm to 10 µm. By increasing the beam diameter, particles having diameters of several millimeters can also be characterized. The velocity of the particles is typically 0.5 m/s to 100 m/s.

For particles with an approximately elliptical cross section, the shape of the particles can be wherein the numerical eccentricity and/or the ratio of the semiaxes, here referred to as ellipticity. Particle overlap is understood in particular to mean that one particle merges in part with another particle. The overlap typically occurs in agglomerates of particles.

An orientation is indicated, for example, by angle sizes with respect to the trajectory of the respective particle, in particular 0° to 360°, or by angle sizes with respect to the beam direction of the radiation, in particular 0° to 180°. Two particles can have any orientation in relation to each other. A particle may be completely or partially obscured by another particle in the beam direction.

An advantageous development of the aforementioned embodiment provides that the predetermined particle class has a characteristic value to distinguish an individual particle, an agglomeration of particles, and/or a coincidence of two individual particles. The characteristic value of the particle class is preferably zero in the event that an individual particle is measured in the measurement volume, one in the event that a coincidence of particles is present, which is in particular understood to mean that a plurality of spaced-apart particles are detected in the measurement volume, and/or two in the event that an agglomerate is present in the measurement volume, which is in particular understood to mean that a plurality of particles in the measurement volume forms a group. In the case of a coincidence, the distance between the particles is usually the order of magnitude of the beam diameter of the radiation or below. For example, this distance is typically 10 µm or less with a beam diameter of 20 µm.

A further refinement of the sensor arrangement is wherein a means for pre-processing the detector signals before determining the selected features of the particles using the detector signals. The pre-processing comprises in particular digital filtering the detector signals, calculating different detector signals, cutting out time periods of the relevant detector signal, and/or averaging detector signals. Thus, noise signals can be advantageously removed from the detector signals and/or detector signals can be combined prior to processing using the algorithm for machine learning. The pre-processed detector signals can be stored after pre-processing for later use or used immediately after pre-processing as input for processing in the evaluation unit.

In further variants of the sensor arrangement, the algorithm for machine learning takes the form of a learning vector quantization (LVQ) algorithm, dense layer neural network, and/or long short-term memory neural network.

Preferably, the sensor arrangement comprises a beam splitter, a beam-shaping element, a photodetector, a polarization element, and/or a beam absorber. Thus, a multiplicity of beams from the radiation source can advantageously be generated, provided with the desired shape and polarization, focused and aligned, and subsequently detected. The beam absorber for absorbing radiation can be used to protect objects or persons from undetected radiation.

It is advantageous if the electromagnetic radiation comprises light. The wavelength of the electromagnetic radiation is preferably between 200 nm and 10.6 µm, in particular between 405 nm and 1550 nm. Light can be generated advantageously in compact, comparatively cost-effective components such as light-emitting diodes or laser diodes.

A method for determining features of particles with a sensor arrangement for detecting features of particles, in particular with a sensor arrangement according to one of the preceding embodiments, has the following steps:
IV. emitting electromagnetic radiation from an emitter;
V. at least in part receiving the electromagnetic radiation with a detector;

VI. guiding particles through a measurement volume, wherein the measurement volume is irradiable by the emitter;

VII. providing, by way of the detector, detector signals from the intensity and/or the polarization of the radiation received by the detector;

VIII. digitizing the detector signals by means of a digitizing unit;

IX. determining at least one feature of the particles flowing through the measurement volume, by way of the detector signals using a trained algorithm for machine learning.

Several features of the particles can be determined. Advantageously, in this method no camera(s) in combination with an image recognition method is/are necessary to determine the features of the particles, such as their shape or size. As a result, the determination of these features can be significantly accelerated compared to methods known from the prior art, so that a quasi-real-time detection of the particle features is possible.

The size of the particles is preferably between 100 nm and 10 mm, in particular between 1 μm and 100 μm. The wavelength of the electromagnetic radiation is preferably between 200 nm and 10.6 μm, in particular between 405 nm and 1550 nm.

A refinement of the method is characterized in that particles with known features are guided through the measurement volume to measure test signals from the detector. The measured test signals from the detector are assigned the features of the known particles, for example the size, velocity and shape of the particles, which is referred to as "labeling" of the detector signals. The algorithm for machine learning can be trained in particular with the measured test signals from the detector for the known features of the particles.

A further refinement of the method is wherein the following steps for training the algorithm for machine learning for determining selected features of particles by way of the signals from the detector:

I. measuring and/or simulating signals from the detector for particles with known features;

II. adapting parameters used by the algorithm for machine learning to reduce the difference between the features of the particles calculated by the algorithm for machine learning and the known features of the particles;

III. repeating steps I to II with further particles with known features until the difference between the calculated features of the further particles and the known features of the further particles falls below a predetermined limit.

For measuring the detector signals, the particles are guided in particular through the measurement volume. The detector signals are assigned to selected features of the particles with the known features and preferably stored to obtain a large data set of known features of the particles and the associated detector signals for training the algorithm for machine learning. The detector signals preferably relate to the intensity and/or polarization of the measured radiation.

This learning method is used to improve the prediction of features of particles by the algorithm for machine learning. Such a learning method comprises in particular error feedback, also referred to as back propagation of error. The algorithm for machine learning preferably comprises a neural network. The parameters of the algorithm for machine learning relate in particular to weightings used by the algorithm for machine learning.

With suitable simulation programs, detector signals can be determined for several tens of thousands, for example 50,000, configurations of particles, wherein the particles of the configurations differ with regard to the aforementioned features such as the shape, velocity and/or distance between the particles. For training and checking the algorithm for machine learning, the configurations of the particles and the associated detector signals can be divided into training, validation and test data, preferably in a ratio of 60:20:20.

Further advantages of the invention result from the description and the drawing. Similarly, the features mentioned above and those yet to be explained further can be used in each case individually or together in any desired combinations. The embodiments shown and described should not be understood to be an exhaustive enumeration, but rather as having an exemplary character for the description of the invention.

FIG. 1 schematically shows a first embodiment of a sensor arrangement 101 for detecting features of particles 12. An emitter 14 is used to emit electromagnetic radiation 16, in particular a laser beam. The radiation 16 emitted by the emitter 14 is received at least in part by a detector 18a. In addition, detector signals from (by way of) the received radiation 16 are provided by the detector 18a.

Particles 12, the features of which are measured by the sensor arrangement 10, flow in a flow direction SR through a measurement volume 20, which is arranged in the direction of the radiation 16 emitted by the emitter 14. A digitizing unit 22 is used to digitize the signals of the detector 18a. An evaluation unit 24 with a computer 26 has the function of evaluating the detector signals after digitization. For this purpose, a trained algorithm 28, in particular a trained neural network, is installed on the computer 26 for determining selected features of the particles 12 by way of the detector signals.

The sensor arrangement $10^I$ has a means 30a for pre-processing the detector signals and a means 30b for assigning the detector signals to the selected features of particles 12 with known features.

The detector signals comprise in particular the intensity, the polarization and/or the scattering angles of the radiation 16 received by the detector. The features of the particles 12 preferably comprise the size of the respective particles, a parameter for the shape of the respective particles, a predetermined particle class, the distance between two respective particles 12, an overlap of particles 12, the flight direction of the respective particles 12, the velocity of the respective particles 12, and/or a spatial orientation of the respective particles 12. The predetermined particle class preferably has a characteristic value to distinguish an individual particle 12, an agglomeration of particles 12, and/or a coincidence of individual particles 12.

Figure 2:
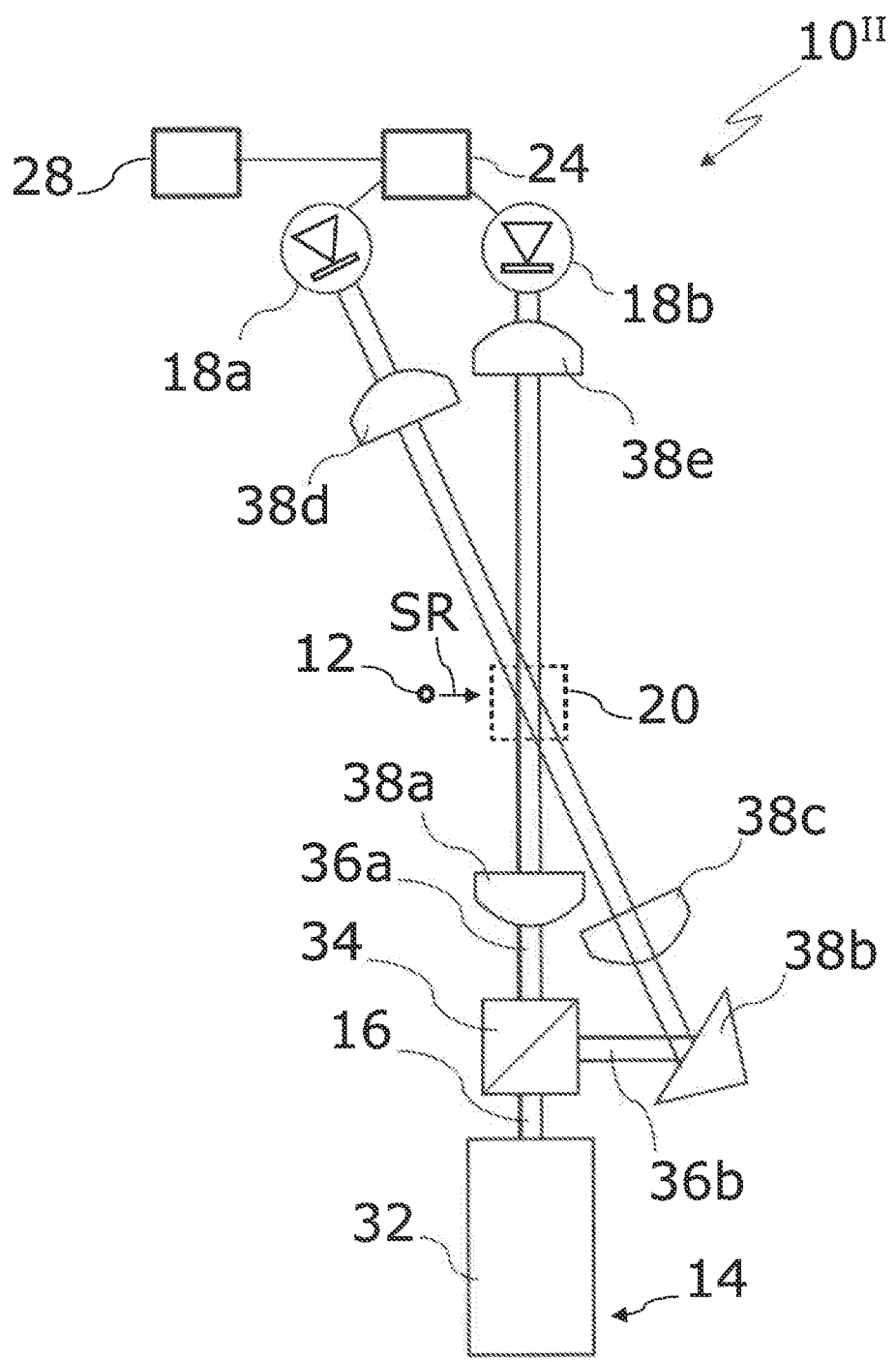
FIG. 2 schematically shows a second embodiment of the sensor arrangement.

FIG. 2 schematically shows a second embodiment of the sensor arrangement $10^{II}$. An emitter 14 designed as a light source 32 is used to emit electromagnetic radiation 16 in the form of light. The light source 32 is designed in particular as a laser diode or light-emitting diode. A beam splitter 34 causes the light to split into several partial beams 36a, 36b, which penetrate a measurement volume 20. Beam-shaping elements 38a, 38b, 38c cause a defined intensity distribution of the partial beams 36a, 36b in the measurement volume 20. Beam-shaping elements 38d, 38e are used to steer the partial beams 36a, 36b onto photodetectors 18a, 18b.

When particles 12 pass through the measurement volume 20 in the flow direction SR, scattering and reflections of the radiation 16 at the particles 12 occur. The attenuation of the transmitted radiation 16, the reflected and/or the scattered radiation 16 is/are measured by the photodetectors 18a, 18b. An evaluation unit 24 with a trained algorithm 28 for machine learning is designed to determine selected properties of the respective particle 12 by way of the signals from the photodetectors 18a, 18b.

Figure 3:
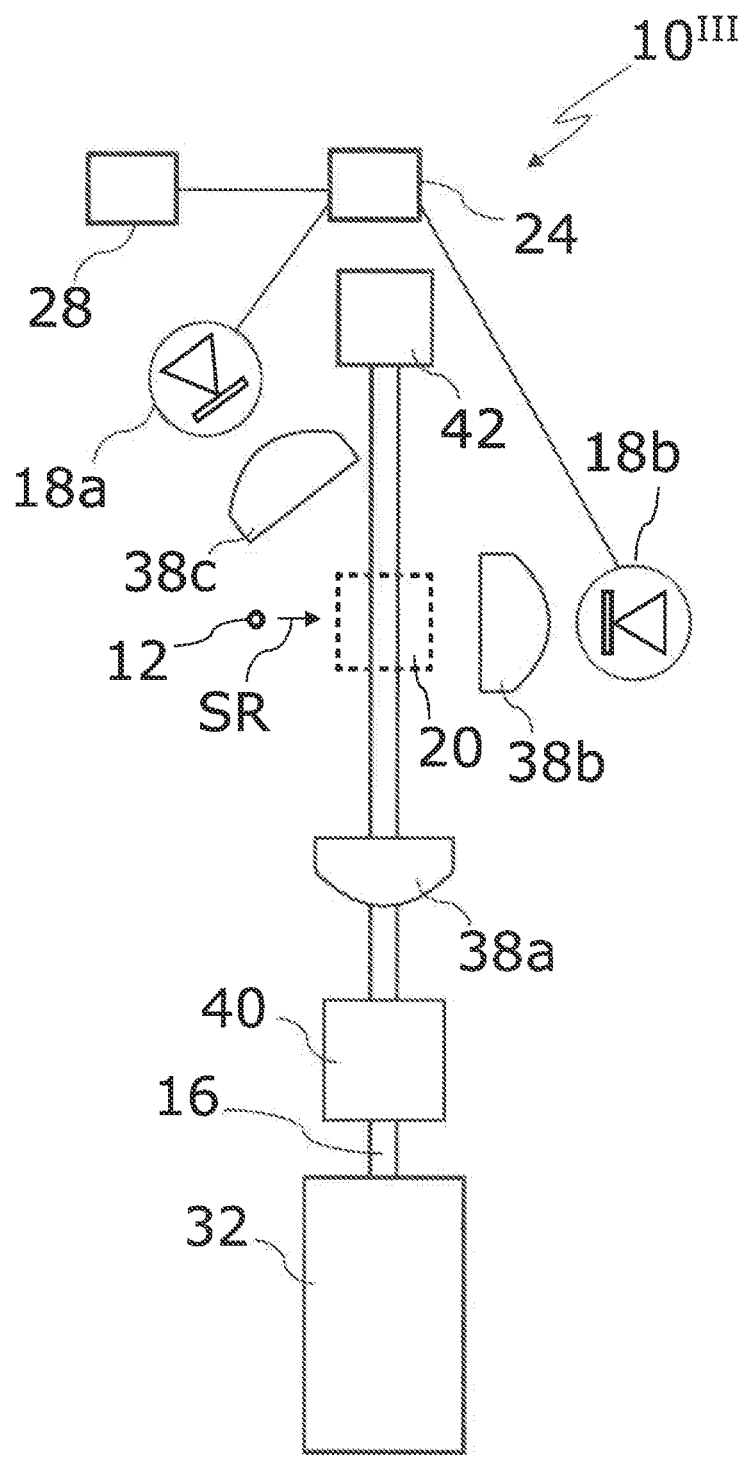
FIG. 3 schematically shows a third embodiment of the sensor arrangement.

FIG. 3 schematically shows a third embodiment of the sensor arrangement $10^{III}$. A light source 32 is designed to emit a light beam 16. A polarization element 40 causes a defined polarization of the light beam 16 in a measurement volume 20. A beam-shaping optical unit 38a gives the light beam 16 a desired shape in the measurement volume 20. The light is reflected at particles 12 which pass through the measurement volume 20 in the flow direction SR and is scattered at different scattering angles. The reflected and/or the scattered radiation 16 is measured by photodetectors 18a, 18b. An evaluation unit 24 with a trained algorithm 28 for machine learning is designed to determine selected properties of the particles 12 by way of the signals from the photodetectors 18a, 18b. The transmitted portion of the radiation 16 is absorbed by a beam absorber 42.

Figure 4:
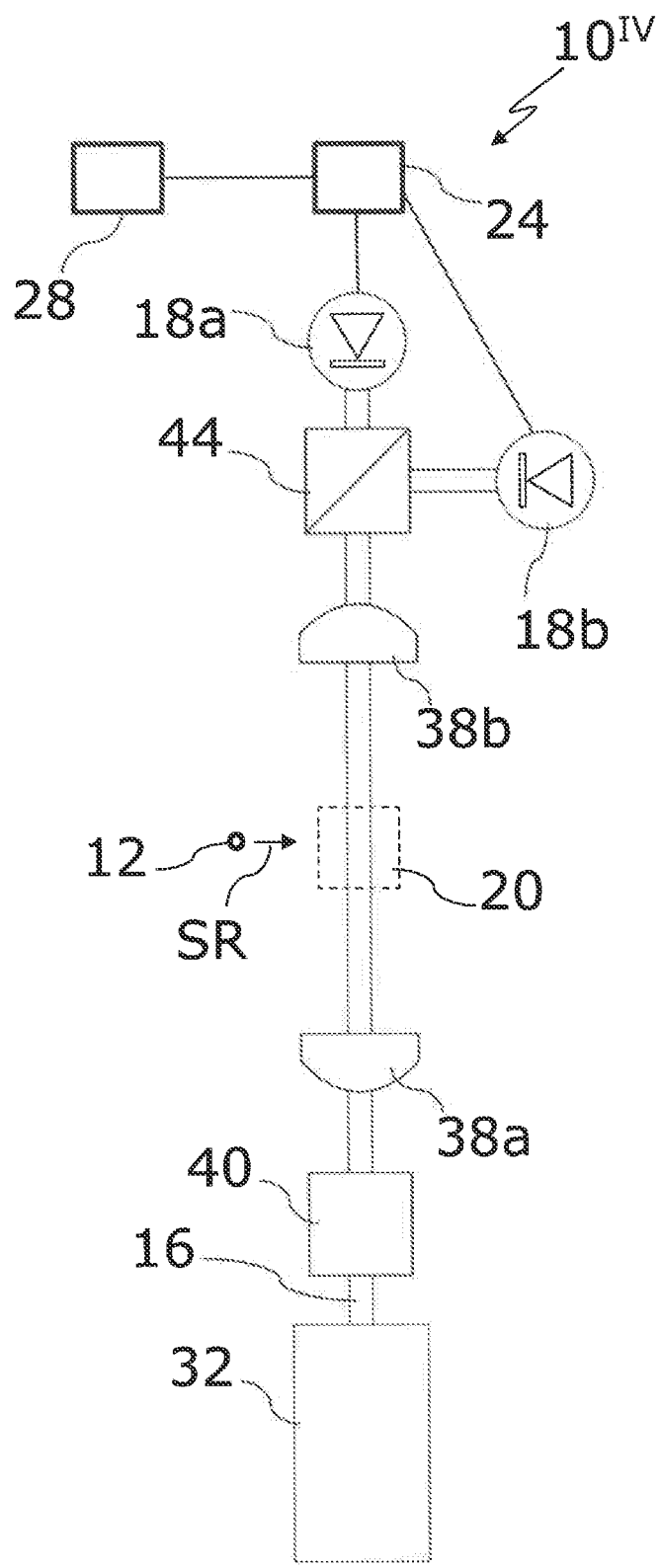
FIG. 4 schematically shows a fourth embodiment of the sensor arrangement.

FIG. 4 schematically shows a fourth embodiment of the sensor arrangement $10^{IV}$. As in the second and third embodiments, a light source 32 is designed to radiate a measurement volume 20 with a light beam 16, wherein a polarization element 40 and a beam-shaping optical unit 38a give the light beam 16 in the measurement volume 20 a desired shape and polarization with a defined intensity distribution. A beam-shaping element 38b has the function to focus the light at a polarization beam splitter 44 in the beam direction downstream of the measurement volume 20 for decomposing the light beam 16 into partial beams 36a, 36b with different polarization components.

The light is reflected at particles 12 which pass through the measurement volume 20 in the flow direction SR and is scattered at different scattering angles. A remaining portion of radiation 16 is transmitted. The transmitted radiation 16 is measured depending on the polarization by photodetectors 18a, 18b. An evaluation unit 24 with a trained algorithm 28 for machine learning is designed to determine selected properties of the respective particle 12 by way of the signals from the photodetectors 18a, 18b.

Figure 5:
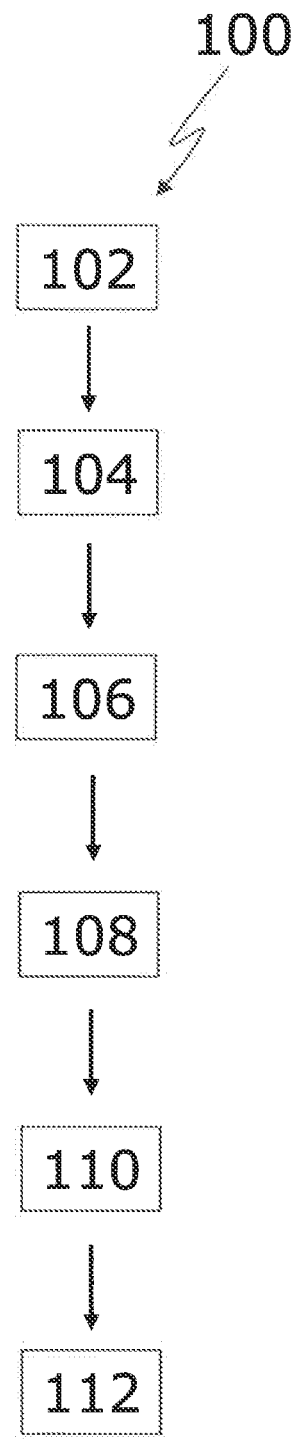
FIG. 5 illustrates a method for determining features of particles according to some embodiments.

FIG. 5 schematically shows a method 100 for determining features of particles 12 (see FIGS. 1 to 4) with the respective sensor arrangement $10^{I}$-$10^{IV}$. In a first step 102, electromagnetic radiation 16 is emitted from an emitter 14 in the direction of at least one detector 18a. In a second step 104, particles 12 are guided through a measurement volume 20, wherein the measurement volume 20 is arranged in the direction of the radiation 16 from the emitter 14. In a third step 106, the electromagnetic radiation 16 is received at least in part using the detector 18a. In a fourth step 108, detector signals from the intensity and/or the polarization of the radiation 16 received by the detector 18a are provided by the detector 18a. In a fifth step 110, the detector signals are digitized by a digitizing unit 22. In a sixth step 112, selected features of the particles 12 flowing through the measurement volume 20 are determined by a trained algorithm 28 for machine learning, in particular a trained neural network, with the aid of the detector signals.

Figure 6:
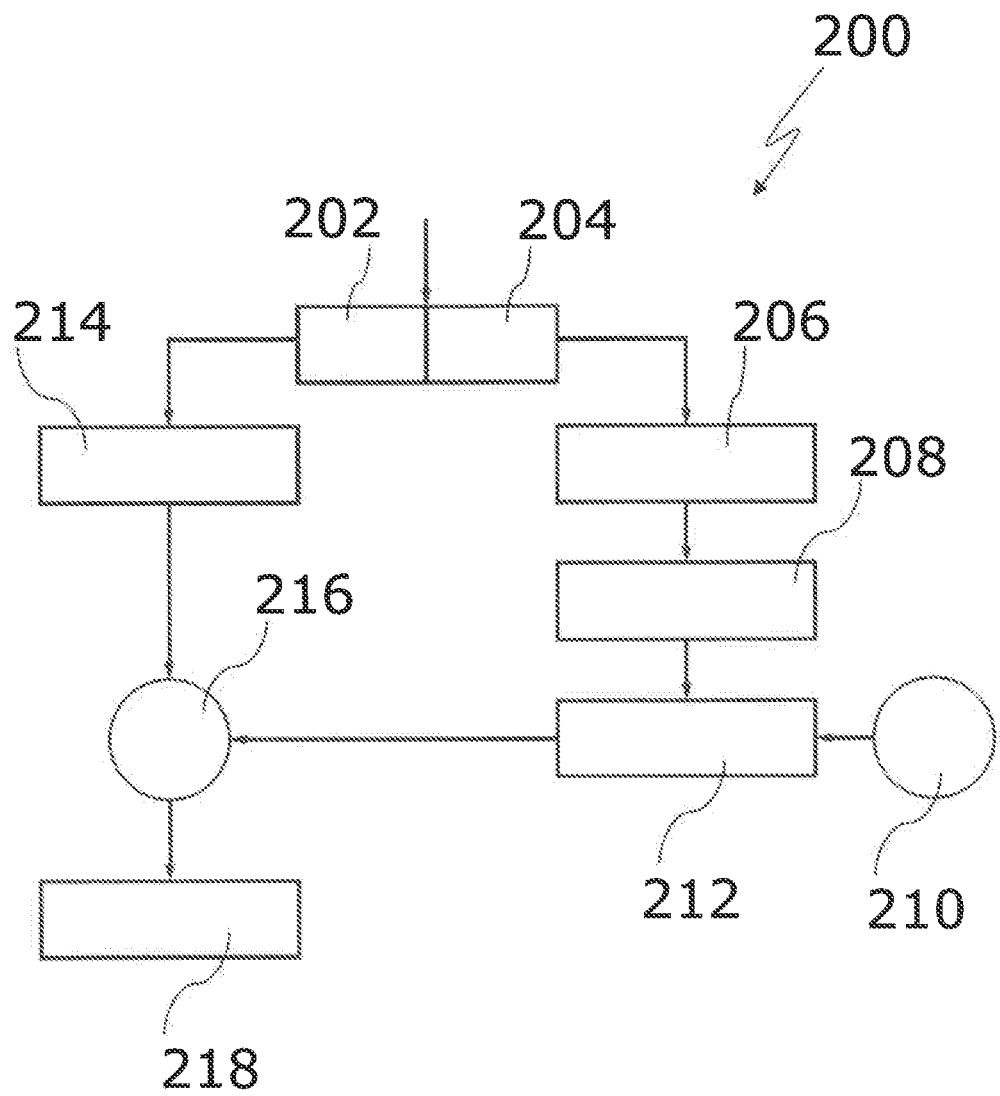
FIG. 6 illustrates a method for determining features of particles according to some embodiments.

FIG. 6 schematically shows a second refinement of the method 200 for determining features of particles 12 (see FIGS. 1 to 4) with the respective sensor arrangement $10^{I}$-$10^{IV}$. In a first step 202 of the second refinement 200, particles 12 with unknown features and, separately therefrom in a second step 204, particles 12 with known features are guided through the irradiated measurement volume 20 and detector signals each obtained from the radiation 16 are pre-processed. The measured detector signals can be supplemented by simulated detector signals. In a third step 206 of the second refinement 200, the detector signals for the particles 12 with the known features are stored. In a fourth step 208 of the second refinement 200, the detector signals are assigned to selected features of the particles 12 with the known features. In a fifth step 210 of the second refinement, an algorithm 28 for machine learning with an initial model for determining selected features of the particles 12 is provided. In a sixth step 212, the algorithm is trained on the basis of the initial model with the detector signals for the particles 12 with known features. In particular, the second, third and fourth steps 204, 206, 208 are repeated several times to this end. In a seventh step 214, the detector signals for particles 12 with the unknown features are stored. In particular, the seventh step 214 takes place simultaneously with the third step 206. In an eighth step 216, the detector signals for the particles 12 with the unknown features are evaluated with the trained algorithm 28 to determine the selected features of these particles 12. In a ninth step 218, these selected features are output.

When combining all the figures of the drawing, embodiments of the invention relate to a sensor arrangement $10^{I}$-$10^{IV}$ for detecting features of particles 12, in which an emitter 14 emits electromagnetic radiation 16, which is at least in part received by a detector 18a, 18b and converted into detector signals. A measurement volume 20, which is designed for guiding particles 12 through it, is arranged in the direction of the radiation 16 from the emitter 14, so that the measurement volume 20 is irradiable by this radiation 16. A digitizing unit 22 converts the detector signals into digital signals. The sensor arrangement $10^{I}$-$10^{IV}$ further comprises an evaluation unit 24 for evaluating the digital signals. The evaluation unit 24 is equipped with a trained algorithm 28 for machine learning to determine selected features of the particles 12 by way of the detector signals.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS $10^{I-IV}$ Sensor arrangement
12 Particle
14 Emitter
16 Radiation
18a, b Detector
20 Measurement volume
22 Digitizing unit
24 Evaluation unit
26 Computer
28 Algorithm
30a Means for pre-processing the detector signals
30b Means for assigning the detector signals
32 Light source
34 Beam splitter
36a, b Partial beams
38a-e Beam-shaping elements
40 Polarization element
42 Beam absorber
44 Polarization beam splitter

The invention claimed is:

1. A sensor arrangement for detecting features of particles, the sensor arrangement comprising:
   an emitter for emitting electromagnetic radiation;
   a detector for receiving the electromagnetic radiation emitted from the emitter and for providing detector signals based on the received electromagnetic radiation;
   a measurement volume irradiable by the electromagnetic radiation emitted by the emitter, the measurement volume configured for receiving particles flowing therethrough;
   a digitizing unit for digitizing the detector signals; and
   an evaluation unit for evaluating the detector signals;
   wherein the evaluation unit stores a trained algorithm for machine learning, and wherein the algorithm is configured for determining at least one feature of the particles based on the detector signals, and
   wherein the algorithm for machine learning is trained by:
   I. measuring and/or simulating test signals from the detector for particles with known features;
   II. adapting parameters used by the algorithm for machine learning to reduce a difference between the at least one feature of the particles calculated by the algorithm for machine learning and the known features of the particles; and
   III. repeating steps I to II with further particles with known features until the difference between the at least one feature of the further particles and the known features of the further particles falls below a predetermined limit.

2. The sensor arrangement as claimed in claim 1, further comprising a further emitter and/or a further detector.

3. The sensor arrangement as claimed in claim 1, wherein the detector signals comprise an intensity, a polarization, and/or scattering angles of the electromagnetic radiation received by the detector.

4. The sensor arrangement as claimed in claim 1, wherein the at least one feature of the particles comprises a size of the particles, a parameter for a shape of the particles, a predetermined particle class, a distance between two respective particles, an overlap of the particles, a flight direction of the particles, a velocity of the particles, and/or a spatial orientation of the particles.

5. The sensor arrangement as claimed in claim 4, wherein the predetermined particle class has a characteristic value to distinguish an individual particle, an agglomeration of particles, and/or a coincidence of two individual particles.

6. The sensor arrangement as claimed in claim 1, wherein the detector signals are pre-processed before the determining the at least one feature of the particles is performed.

7. The sensor arrangement as claimed in claim 1, wherein the algorithm for machine learning comprises a learning vector quantization algorithm, dense layer neural network, and/or long short-term memory neural network.

8. The sensor arrangement as claimed in claim 1, further comprising a beam splitter, a beam-shaping element, a photodetector, a polarization element, and/or a beam absorber.

9. The sensor arrangement as claimed in claim 1, wherein the electromagnetic radiation comprises light.

10. A method for determining features of particles with a sensor arrangement, the method comprising:
    emitting electromagnetic radiation from an emitter;
    at least partially receiving the electromagnetic radiation using a detector;
    guiding particles through a measurement volume irradiable by the emitter;
    providing, by the detector, detector signals from an intensity and/or a polarization of the electromagnetic radiation received by the detector;
    digitizing the detector signals using a digitizing unit; and
    determining at least one feature of the particles flowing through the measurement volume based on the detector signals using a trained algorithm for machine learning,
    wherein the algorithm for machine learning is trained by:
    I. measuring and/or simulating test signals from the detector for particles with known features;
    II. adapting parameters used by the algorithm for machine learning to reduce a difference between the at least one feature of the particles calculated by the algorithm for machine learning and the known features of the particles; and
    III. repeating steps I to II with further particles with known features until the difference between the at least one feature of the further particles and the known features of the further particles falls below a predetermined limit.

11. The method as claimed in claim 10, wherein the particles with known features are guided through the measurement volume in order to measure the test signals from the detector.

* * * * *